United States Patent
Arai et al.

(10) Patent No.: US 11,423,409 B2
(45) Date of Patent: Aug. 23, 2022

(54) ELECTRONIC TRANSACTION DEVICE, ELECTRONIC TRANSACTION VERIFICATION DEVICE, AND ELECTRONIC TRANSACTION METHOD

(71) Applicant: HITACHI, LTD., Tokyo (JP)

(72) Inventors: Yusuke Arai, Tokyo (JP); Tatsuya Sato, Tokyo (JP); Yosuke Himura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 25 days.

(21) Appl. No.: 16/543,865

(22) Filed: Aug. 19, 2019

(65) Prior Publication Data

US 2020/0074468 A1    Mar. 5, 2020

(30) Foreign Application Priority Data

Sep. 5, 2018  (JP) .............................. JP2018-165674

(51) Int. Cl.
G06Q 20/40    (2012.01)
G06Q 20/38    (2012.01)

(52) U.S. Cl.
CPC ......... *G06Q 20/405* (2013.01); *G06Q 20/389* (2013.01)

(58) Field of Classification Search
CPC .... G06Q 20/405; G06Q 20/389; G06Q 20/00; G06Q 40/00

(Continued)

(56) References Cited

U.S. PATENT DOCUMENTS

2013/0346302 A1* 12/2013 Purves ................. G06Q 20/102
                                                                   705/40
2014/0108236 A1*  4/2014 Purves ................. G06Q 20/384
                                                                   705/39

(Continued)

FOREIGN PATENT DOCUMENTS

JP        2017-091149 A      5/2017

OTHER PUBLICATIONS

Extended European Search Report received in corresponding European Application No. 19192267.3 dated Feb. 3, 2020.

(Continued)

*Primary Examiner* — Christopher Bridges
*Assistant Examiner* — Timothy T. Hsieh
(74) *Attorney, Agent, or Firm* — Mattingly & Malur, PC

(57) ABSTRACT

According to one embodiment, an electronic transaction device includes: a relationship map storage unit that stores a relationship map (a participant relationship map) which is information indicating a relationship between a plurality of parties involved in a predetermined transaction; a policy requirement storage unit that stores policy requirements, which are requirements for the parties involved in the transaction, necessary for the closing of the transaction; an agreement policy calculation unit that generates an agreement policy which is a condition related to an approver of a transaction indicated by transaction data holding a predetermined transaction content, based upon the relationship map and the policy requirements; and an approval request transmission unit that transmits a predetermined approval request to a predetermined information processing device associated with an approver of a transaction specified based upon the generated agreement policy.

13 Claims, 11 Drawing Sheets

(58) Field of Classification Search
USPC .................................................. 705/35, 44
See application file for complete search history.

(56) References Cited

U.S. PATENT DOCUMENTS

| | | | | |
|---|---|---|---|---|
| 2015/0100477 | A1* | 4/2015 | Salama | G06Q 20/12 |
| | | | | 705/39 |
| 2016/0267409 | A1* | 9/2016 | Vatnani | G06Q 10/0637 |
| 2016/0300220 | A1* | 10/2016 | Sethi | G06Q 20/322 |
| 2018/0330348 | A1* | 11/2018 | Uhr | G06Q 20/4014 |
| 2020/0065300 | A1* | 2/2020 | Yang | G06F 16/2379 |

OTHER PUBLICATIONS

Santo, A. et al., "Applicability of Distributed Ledger Technology of Capital Market Infrastructure", Aug. 30, 2016, pp. 1-27, vol. 15, URL: https://pdfs.semanticscholar.org/2d5b/bbdf08e597e-3342864aff26943231c7d1bdd.pdf.

Wust, K. et al., Do you need a Blockchain?, 2018 Crypto Valley Conference on Blockchain Technology, IEEE, Jun. 20, 2018, pp. 45-54.

Vukolic, M., "Rethinking Permissioned Blockchains", Proceedings of the ACM Workshop on Blockchain, Cryptocurrencies and Contracts, Jan. 1, 2017, pp. 3-7.

Satoshi Nakamoto, "Bitcoin: A Peer-to-Peer Electronic Cash System", online Search on Feb. 27, 2018, Internet (https://bitcoin.org/bitcoin.pdf).

"Hyperledger Fabric", online search on Feb. 27, 2018, Internet (http://hyperledger-fabric.readthedocs.io/en/latest/).

Communication Pursuant to Article 94(3) EPC received in corresponding European Application No. 19 192 267.3 dated Mar. 1, 2021.

* cited by examiner

FIG. 5

PARTICIPANT RELATIONSHIP MAP

| PARTICIPANT NAME | org1 | org2 | org3 | ... |
|---|---|---|---|---|
| org1 | 1 | 0.6 | 0.1 | ... |
| org2 | 0.6 | 1 | 0.3 | ... |
| org3 | 0.1 | 0.3 | 1 | ... |
| ... | ... | ... | ... | 1 |

FIG. 6

POLICY REQUIREMENTS

| REQUIREMENT ID | key | value |
|---|---|---|
| 0 | POLICY CONDITIONAL EXPRESSION | (x OF ESSENTIAL NODE) and (y OF THIRD-PARTY NODE) |
| 1 | ESSENTIAL NODE FRAME x | 2 |
| 2 | ESSENTIAL NODE | orgA, orgB, orgC |
| 3 | THIRD-PARTY NODE FRAME y | 1 |
| 4 | THIRD-PARTY NODE DESIGNATION CONDITION | min_1 |
| ... | ... | ... |

FIG. 7

AGREEMENT POLICY                                P100

| NODE TYPE | FRAME | ORGANIZATION NAME | | |
|---|---|---|---|---|
| ESSENTIAL NODE | 2 | orgA | orgB | orgC |
| THIRD-PARTY NODE | 1 | org2 | - | - |
| ... | | ... | ... | ... |

EXAMINATION INFORMATION WHEN PARTICIPATING IN CONSORTIUM   T400

PARTICIPANT INFORMATION (T410)

| ORGANIZATION NAME | INDUSTRY TYPE | ROLE | ... |
|---|---|---|---|
| org1 | MANUFACT-URING INDUSTRY | SUPPLIER | ... |
| org2 | RETAIL INDUSTRY | BUYER | ... |
| org3 | PUBLIC OFFICE | AUDITOR | ... |
| ... | ... | ... | ... |

T411  T412  T413

PARTICIPANT RELATIONSHIP INFORMATION (T420)

| RELATIONSHIP INFORMATION ID | ORGANIZATION 1 | ORGANIZATION 2 | RELATIONSHIP | DEGREE |
|---|---|---|---|---|
| 1 | org1 | org2 | SUBSIDIARY COMPANY | - |
| 2 | org3 | org4 | CAPITAL ALLIANCES | 50% |
| ... | ... | ... | ... | ... |

T421  T422  T423  T424

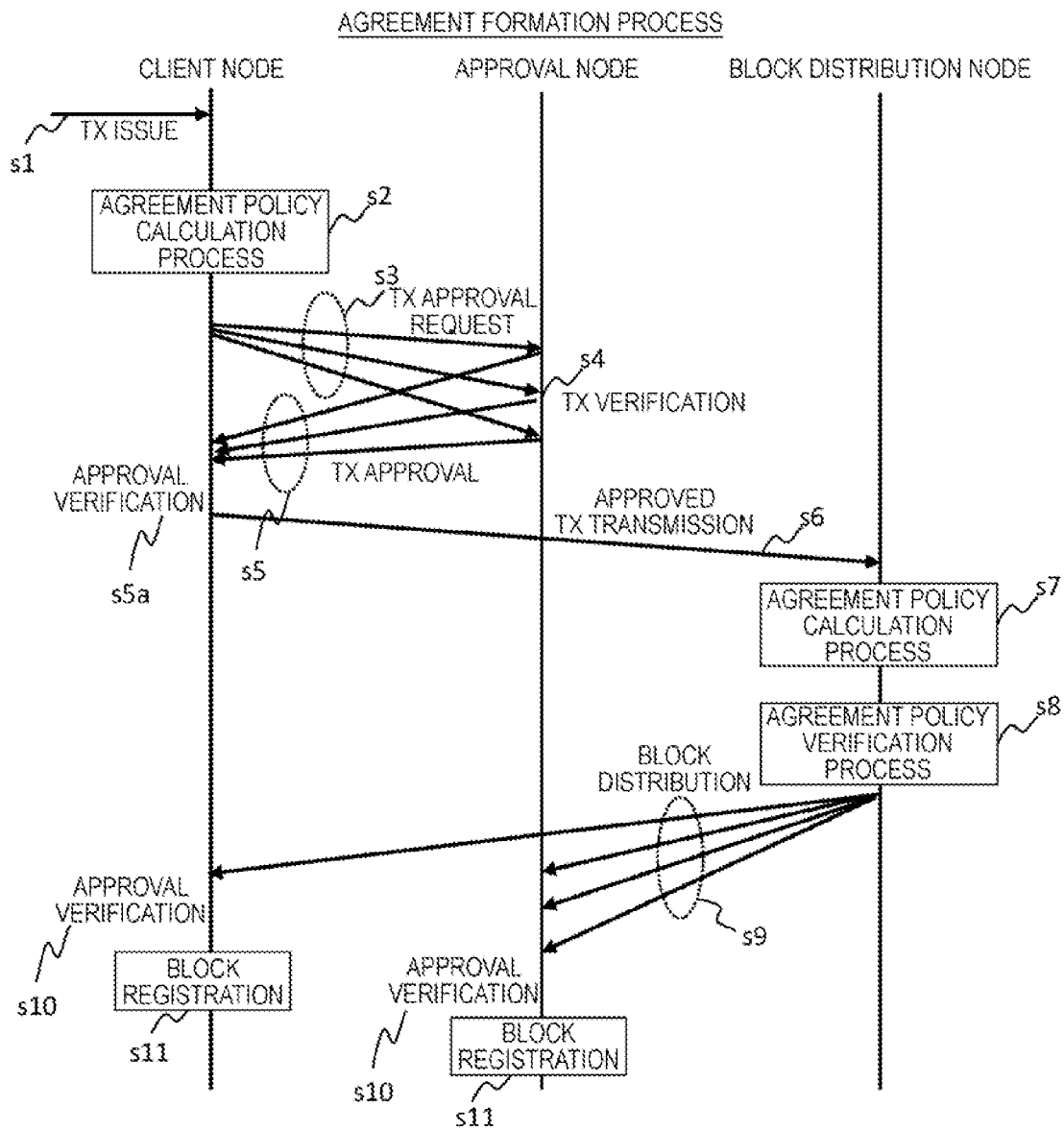

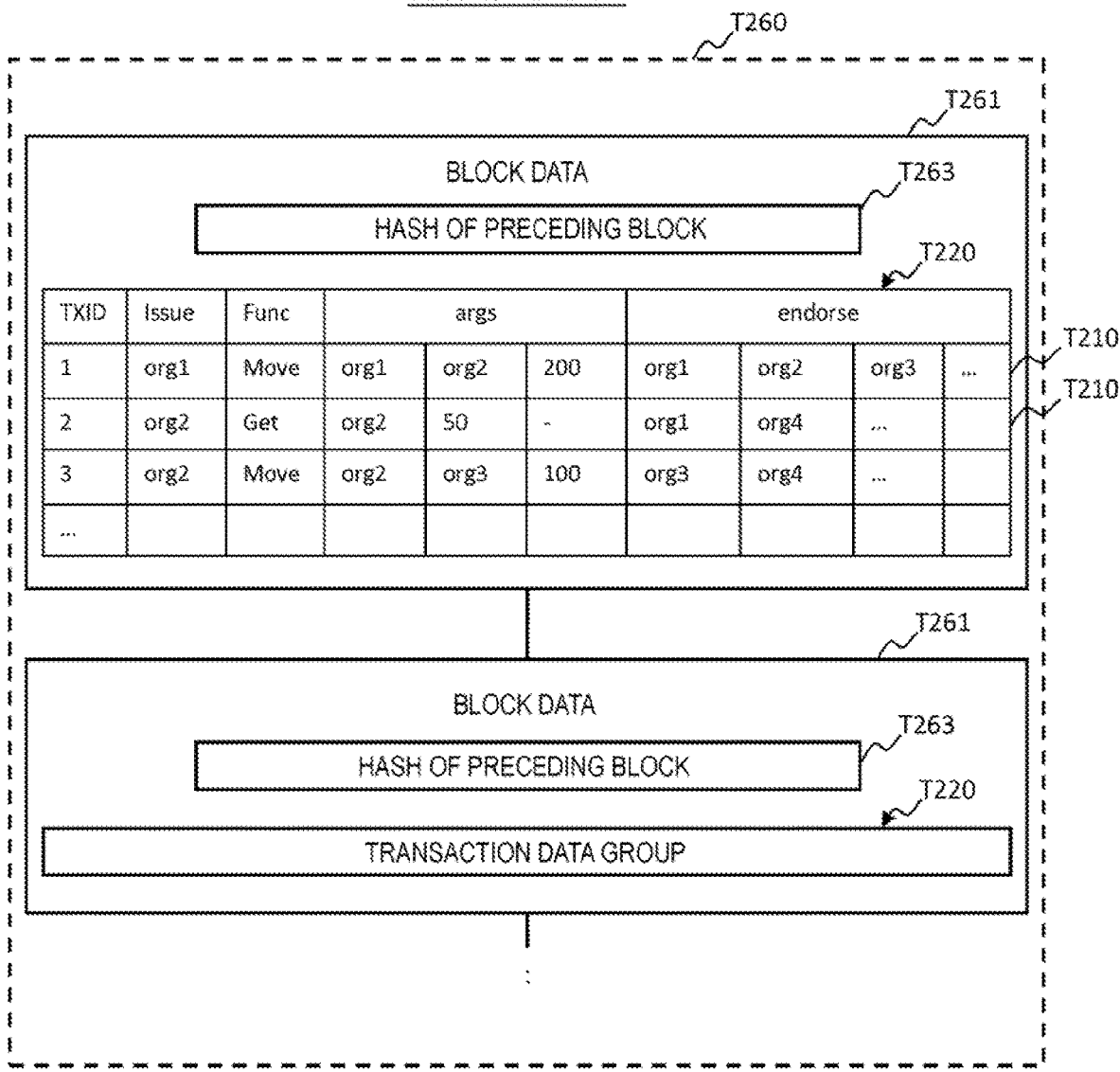

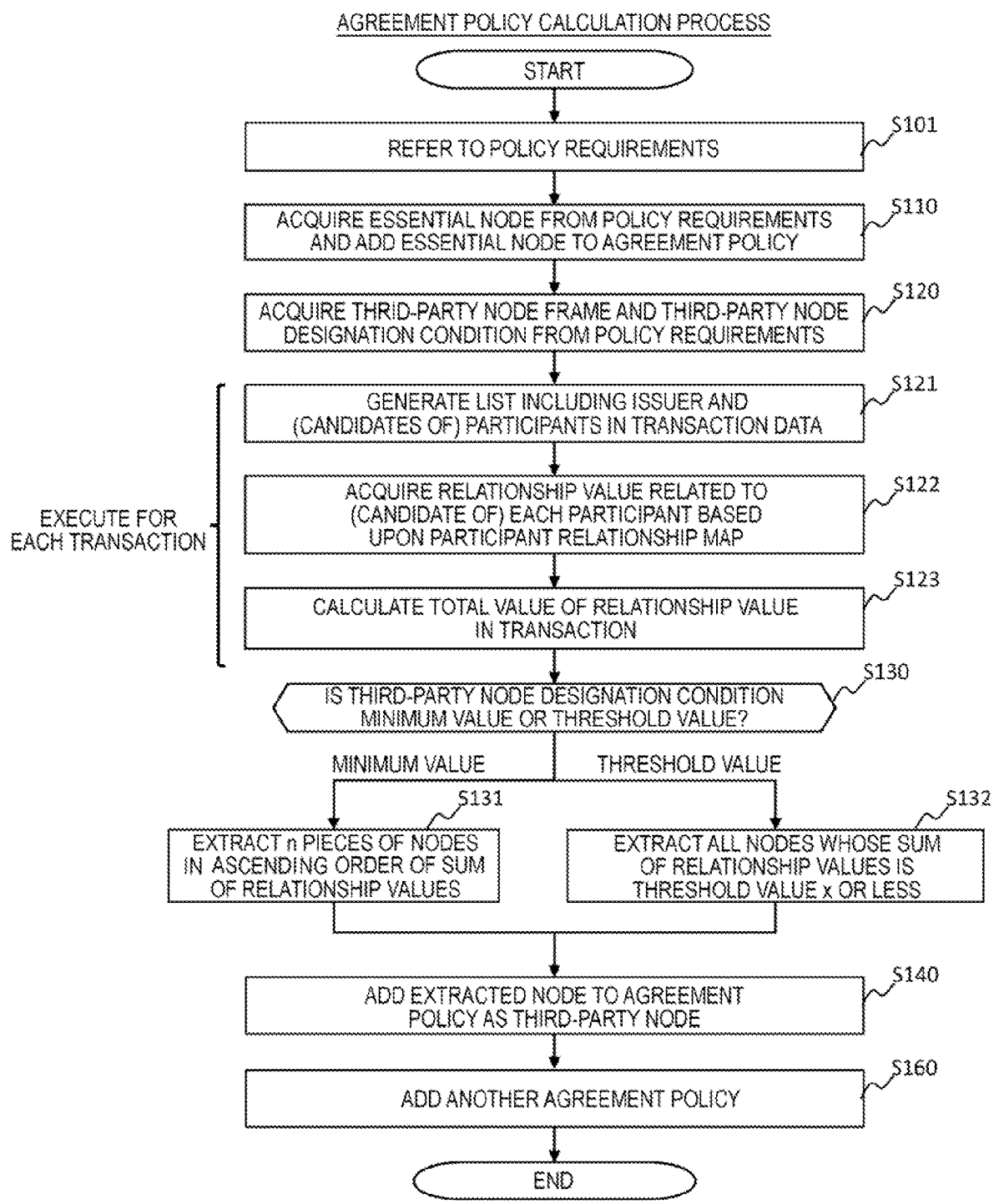

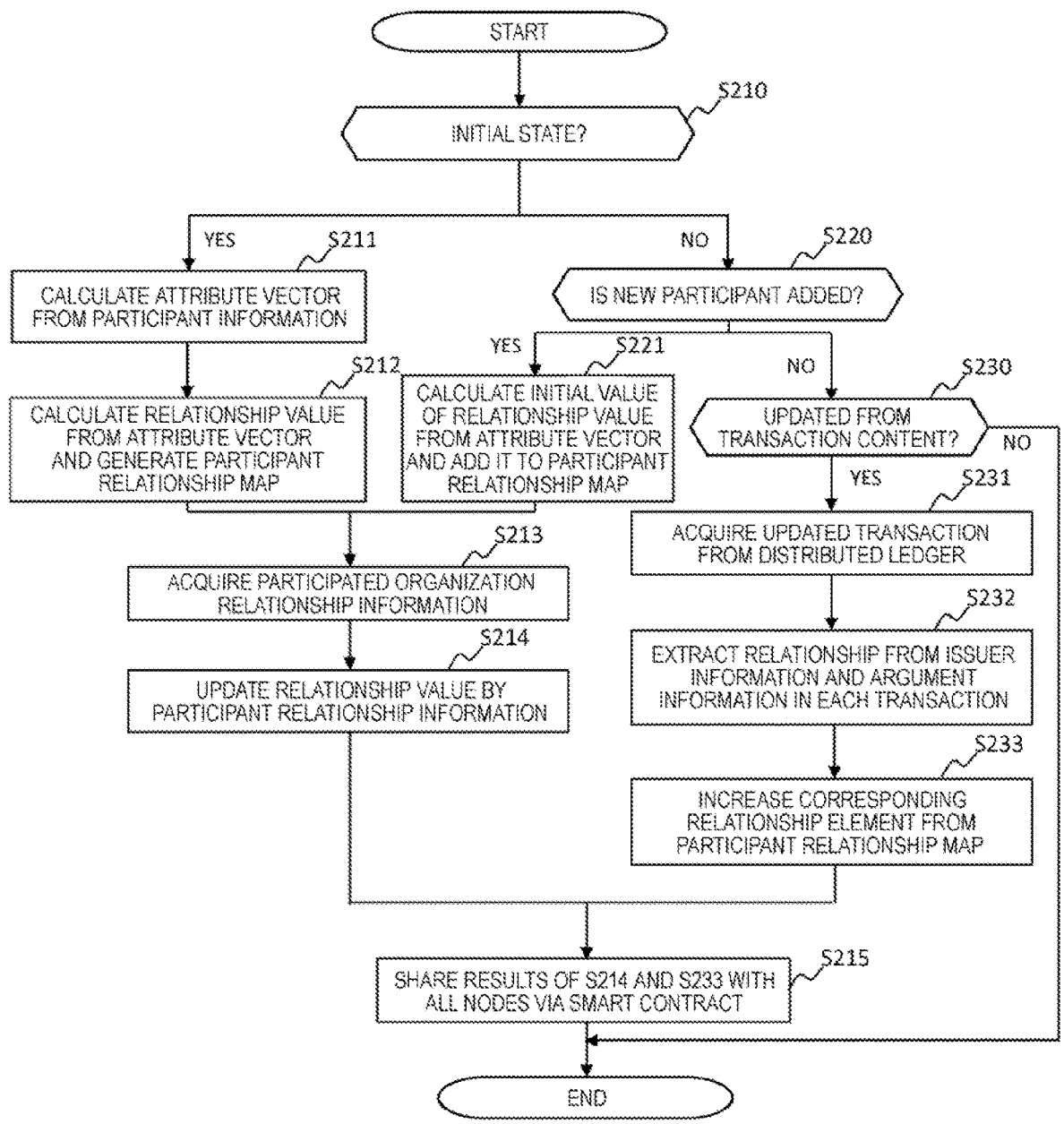

UPDATE TRANSACTION OF PARTICIPANT RELATIONSHIP MAP

ELECTRONIC TRANSACTION DEVICE, ELECTRONIC TRANSACTION VERIFICATION DEVICE, AND ELECTRONIC TRANSACTION METHOD

CROSS-REFERENCE TO RELATED APPLICATION

This application claims priority pursuant to Japanese patent application No. 2018-165674, filed on Sep. 5, 2018, the entire disclosure of which is incorporated herein by reference.

BACKGROUND

The present invention relates to an electronic transaction device, an electronic transaction verification device, and an electronic transaction method.

In a related art, as a technology for replacing a transaction between parties which has been conducted through centralized institutions such as a financial institution, a government, and the like with a direct transaction by P2P (Peer to Peer) between the parties, a so-called distributed ledger technology (so-called, a blockchain (BC: Block Chain)) is utilized (for example, "A Peer-to-Peer Electronic Cash System", [online], [Search on Feb. 27, 2018], Internet (https://bitcoin.org/bitcoin.pdf) (hereinafter, referred to as NPL 1) related to a Bitcoin which is a type of virtual currency). The distributed ledger technology is considered for its application in a wide range of fields such as a financial field, IoT (Internet of Things), and the like as a mechanism for managing and sharing trustworthy data and for executing and managing a transaction based upon a contract. For example, in the Bitcoin described in NPL 1, a node called a minor determines the validity of transaction data (hereinafter, also referred to as a transaction or a TX) on a P2P network, and then, an operation of calculating a specific hash value, which is called a proof-of-work, is executed to perform confirmation. The confirmed transactions are collected as one block and are recorded in a distributed ledger in the form of the blockchain.

The distributed ledger technology can be classified into several types according to the configurations thereof. For example, the classifications thereof include: a "public type distributed ledger" in which a distributed ledger network is formed among unspecified multiple nodes; a "consortium type distributed ledger" in which a plurality of specific organizations form a consortium and the distributed ledger network is formed between nodes owned by each organization; and a "private type distributed ledger" in which the distributed ledger network is formed between nodes in a specific organization. In particular, business processes across organizations are expected to be streamlined by using the consortium type distributed ledger proposed as an enterprise use, and the like.

In recent years, based upon the above-described BC implemented with Bitcoin, various derivative technologies related to the BC and the distributed ledger are proposed and the improvement thereof continues. For example, main characteristics of the current BC include: (1) confirming a transaction by an agreement formation or approval by (arbitrary or specific) participants rather than by a centralized institution in a transaction between the participants on the BC network; (2) making falsification substantially impossible by collecting a plurality of transactions as a block, by recording the block in a distributed ledger in a chain connection, and by applying hash calculation to successive blocks; and (3) enabling all the participants to confirm the transaction by allowing all the participants to share the same distributed ledger. In order to allow the distributed ledger technology to be applicable not only to the transaction of the virtual currency disclosed in NPL 1, but also to complicated transaction conditions and various applications, logic as well as (transaction) data can be managed in the distributed ledger. This logic is referred to as a smart contract.

As a technology for realizing a transaction by a distributed type ledger, there is an agreement formation algorithm that determines an agreement process for sharing a transaction among a plurality of parties. The agreement formation algorithm realizes a reliable transaction among a plurality of participants, for example, through an agreement formation in which another participating node approves a transaction issued from a node (a participating node) of a certain transaction participant. For example, in JP-A-2017-91149 (hereinafter, referred to as PTL 1), disclosed is a method of strengthening block generation rights by calculating the reliability of the node from past transaction data for a public type distributed ledger using an agreement formation algorithm called proof of work.

As a representative agreement formation algorithm used for a consortium-type distributed ledger base, for example, there is a Practical *Byzantine* Fault Tolerance (PBFT) method of reaching a transactional agreement by a process of a majority decision of all the participating nodes. In this algorithm, the agreement of the transaction is reached by a majority decision method in which the transaction is transmitted to all the nodes and its approval is acquired from each node. Since the above-mentioned method is required to transmit the transaction to all the nodes, there is a problem in that as the number of nodes increases, a TPS (transaction/Sec) which is an indicator of transaction performance deteriorates. On the other hand, in recent years, in order to improve the transaction performance, a new agreement formation algorithm, in which the transaction is accepted by approval from some nodes instead of all the nodes, is developed and introduced.

As an application example of such an agreement formation algorithm, for example, in an agreement formation algorithm disclosed in "Hyperledger Fabric", [online], [search on Feb. 27, 2018], Internet (http://hyperledger-fabric.readthedocs.io/en/latest/) (hereafter, referred to as NPL 2), a participating node (hereinafter referred to as a client node) receiving a transaction transmits the transaction only to some participating nodes (hereinafter referred to as an approval node, also referred to as Endorser in NPL 2) among other participating nodes, and after the approval is received therefrom, the transaction to which approval information is imparted is transmitted to a block distribution node (also referred to as an Orderer in NPL 2) which is another participating node. The block distribution node performs the sequence of the transaction and the alignment thereof, or determines whether or not the agreement is reached, and distributes a block in which the transactions are collected to all the participating nodes including the participating nodes other than the approval node. Another participating node receives a result (block) of the transaction after approval, thereby making the approval process unnecessary.

In such a consortium type agreement formation algorithm in which only a specific node (an approval node) performs approval, a piece of information on the criteria for node selection and agreement is required, and such information is hereinafter referred to as an agreement policy.

Meanwhile, the agreement policy has a problem that a fraudulent transaction is easy to occur when the design thereof is defective. For example, if there is a defect in the design of the agreement policy, by the client node colluding with the approval node, the client node issues a fraudulent transaction whose approval is normally rejected by the approval node and thus the approval node may approve the fraudulent transaction. As a result, block data including the fraudulent transaction are distributed to all the participating nodes.

Such fraudulence is a problem of the design itself of the agreement policy and may occur regardless of the tamper-resistance of a hash chain in the distributed ledger technology. Therefore, the design of the agreement policy greatly affects the reliability of the distributed ledger technology.

Here, according to a method in PTL 1, the reliability of a single node association (in other words, a single organization) can be estimated by obtaining information on a node (a participant), but since a relationship between the nodes is not considered, it is not effective to suppress collusion between the nodes.

Therefore, it is conceivable to increase the number of approval nodes in order to prevent the collusion between the nodes, but in this case, since a processing load is applied such that the transaction speed is affected, there is a concern that the transaction performance may deteriorate.

SUMMARY

The present invention has been made in consideration of the above-described circumstances, and an object thereof is to provide an electronic transaction device, an electronic transaction verification device, and an electronic transaction method capable of safely performing an electronic transaction without deteriorating the processing performance of a transaction.

In order to solve the above-described circumstances, the present invention provides an electronic transaction device, including: a relationship map storage unit that stores a relationship map which is information indicating a relationship between a plurality of parties in a predetermined transaction; a policy requirement storage unit that stores policy requirements, which are requirements for the parties involved in the transaction, necessary for the closing of the transaction; an agreement policy calculation unit that generates an agreement policy which is a condition related to an approver of a transaction indicated by transaction data holding a predetermined transaction content, based upon the relationship map and the policy requirements; and an approval request transmission unit that transmits a predetermined approval request to a predetermined information processing device associated with an approver of a transaction specified based upon the generated agreement policy.

According to the present invention, an electronic transaction can be safely performed without deteriorating the processing performance of a transaction.

BRIEF DESCRIPTION OF THE DRAWINGS

FIG. 5 is a diagram illustrating an example of a participant relationship map;

FIG. 6 is a diagram illustrating an example of policy requirements;

FIG. 7 is a diagram illustrating an example of an agreement policy;

FIG. 8 is a diagram illustrating an example of examination information when participating in a consortium;

FIG. 10 is a sequence diagram illustrating an example of an agreement formation process;

FIG. 11 is a diagram illustrating an example of transaction data;

FIG. 12 is a diagram illustrating an example of approved transaction data generated by the client node;

FIG. 13 is a diagram illustrating an example of blockchain data;

FIG. 14 is a flowchart illustrating an example of an agreement policy calculation process performed by the client node;

FIG. 15 is a flowchart illustrating an example of a participant relationship calculation process.

DESCRIPTION OF EMBODIMENTS

Hereinafter, an embodiment of the present invention will be described with the accompanying drawings.

[System Configuration]

Figure 1:
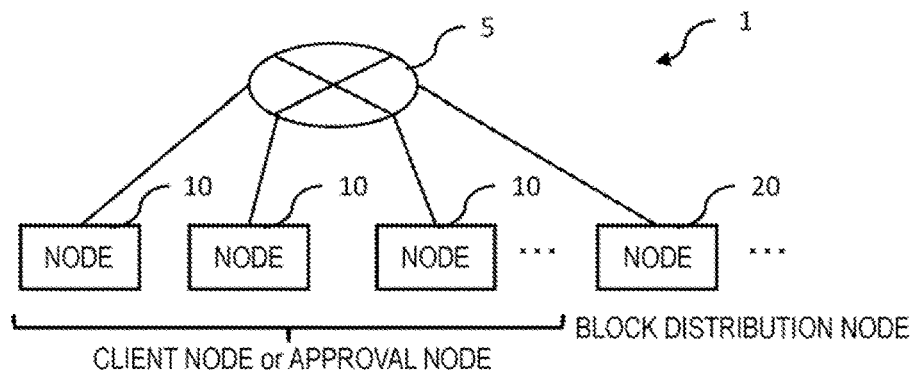
FIG. 1 is a diagram illustrating an example of a basic configuration of an electronic transaction system 1 according to an embodiment.

FIG. 1 is a diagram illustrating an example of a basic configuration of an electronic transaction system 1 according to an embodiment. The electronic transaction system 1 is configured to include a plurality of electronic transaction devices 10 and one or more electronic transaction verification devices 20 (hereinafter, also referred to as a block distribution node) connected to each other via a wired or wireless communication network 5 such as the Internet, a LAN, a WAN, and the like. The electronic transaction system 1 is introduced, for example, to an organization (a consortium) formed of a plurality of participants such as a bank group for performing financial transactions. The electronic transaction system 1 according to the embodiment is an information processing system that performs an electronic transaction by using a consortium type distributed ledger technology among so-called blockchain technologies (distributed ledger technologies), and each electronic transaction device 10 executes an electronic transaction (a transaction) with another electronic transaction device 10 as necessary. The electronic transaction device 10 includes a client node and an approval node as described below.

Figure 2:
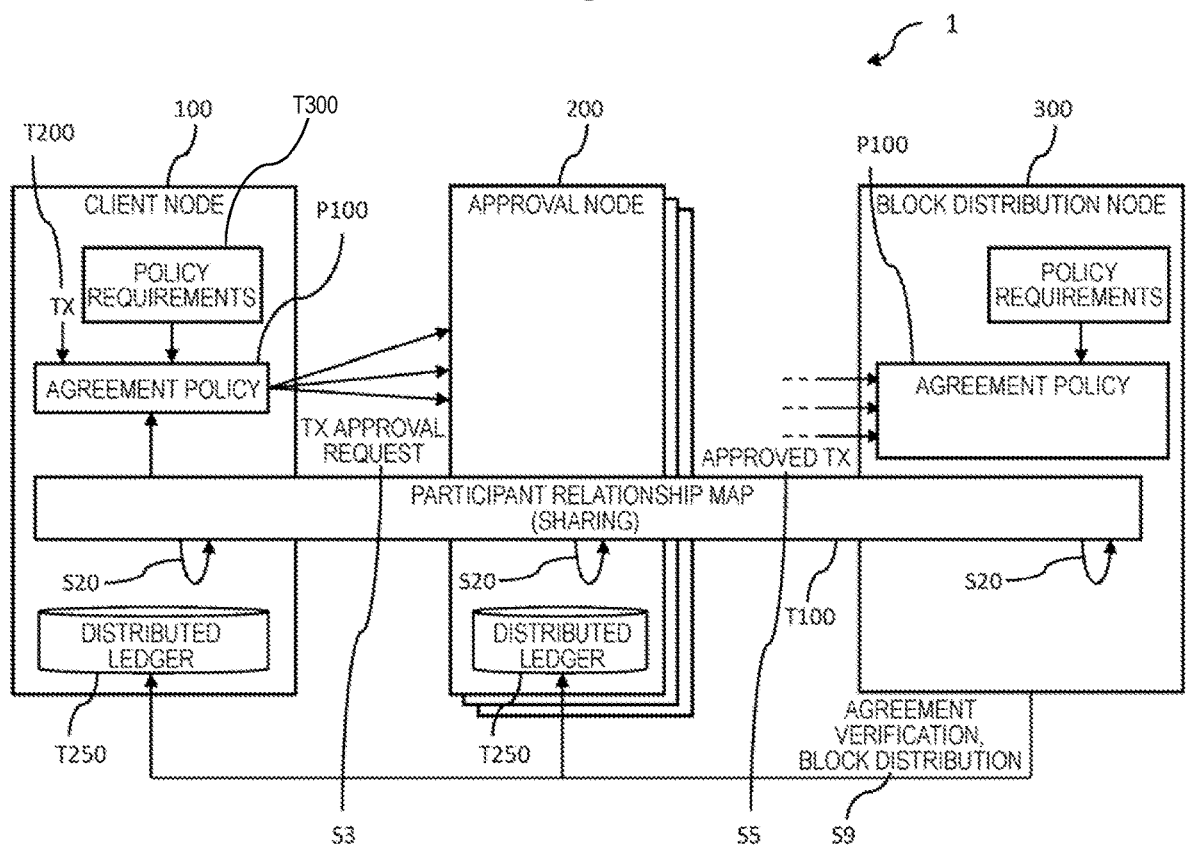
FIG. 2 is a diagram illustrating an outline of processes performed by the electronic transaction system 1 according to the embodiment.

FIG. 2 is a diagram illustrating an outline of processes performed by the electronic transaction system 1 according to the embodiment. As illustrated in the diagram, the electronic transaction system 1 according to the embodiment performs an agreement formation process configured by an approval request process (S3) of transaction data T200 related to a predetermined transaction from a client node 100 to an approval node 200, an approval process (S5) of the transaction data T200 by a block distribution node 300 and a distribution process (S9) of block data related to the approved transaction; and a participant relationship calculation process (S20) for performing predetermined calculation which specifies a relationship between respective participants (nodes).

Specifically, the respective nodes share information (a participant relationship map T100) on a relationship between the respective nodes (a relationship between the participants). When issuing an approval request with respect to a transaction (transaction data T200), the client node 100 determines a node, and the like having a weak relationship with the client node 100 itself as the approval node 200 by calculating an agreement policy P100 which is a condition related to an approver of the transaction based upon the participant relationship map T100 and policy requirements T300 which is requirements for parties involved in the transaction, necessary for the closing of the transaction. Next, the client node 100 issues the approval request to the determined approval node 200 (S3), and the approval node 200 performs the approval, thereby performing the agreement formation on the transaction.

Thereafter, the transaction data T200 including the approval information are transmitted to the block distribution node 300 (S5), and after verifying whether or not the transaction data T200 satisfy the agreement policy P100 again, the block distribution node 300 generates blockchain data related to the transaction data T200 and transmits the generated blockchain data to the respective nodes (the client node 100, the approval node 200, and the like) (S9). The respective nodes share the received blockchain data in a distributed ledger T250.

Further, in the electronic transaction system 1 according to the embodiment, the client node 100 and the approval node 200 execute the participant relationship calculation process S20 for generating the participant relationship map T100, respectively, at a predetermined timing. The client node 100 or the approval node 200 executing the participant relationship calculation process S20 transmits the generated participant relationship map T100 to other nodes, thereby sharing the generated participant relationship map T100 therewith.

As described above, in the electronic transaction system 1, the blockchain data related to the transaction data T200 and the blockchain data related to the participant relationship map T100 are shared between the respective nodes.

Further, the functions of the client node 100, the approval node 200, and the block distribution node 300 may be provided in common with the respective electronic transaction device 10 and electronic transaction verification device 20 or may be assigned to the respective electronic transaction device 10 or the electronic transaction verification device 20. In the embodiment, since an issuer of a transaction can change for each transaction, the client node 100 and the approval node 200 are assumed to have the same function. Further, a plurality of nodes can be assigned to each participant in the consortium, but in the embodiment, it is assumed that one node is assigned to each participant.

Figure 3:
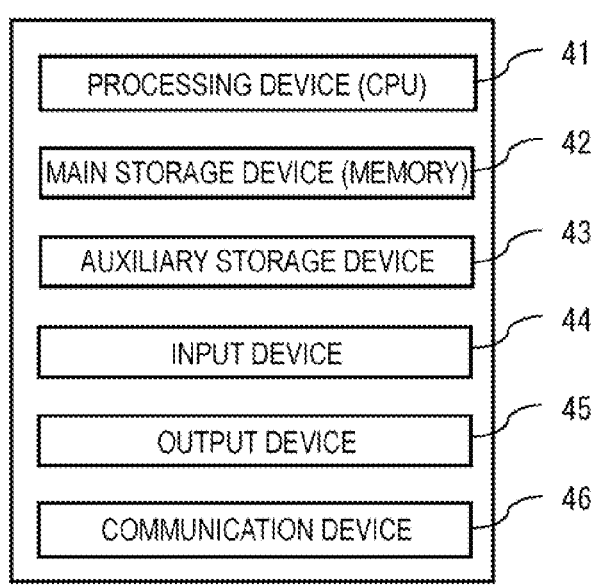
FIG. 3 is a diagram illustrating an example of hardware provided in each node.

Further, FIG. 3 is a diagram illustrating an example of hardware provided in each node. Each node includes: a processing device 41 (a processor) such as a CPU (Central Processing Unit), and the like; a main storage device 42 such as a RAM (Random Access Memory), a ROM (Read Only Memory), and the like; an auxiliary storage device 43 formed of an external storage device such as an HDD (Hard Disk Drive), an SSD (Solid State Drive), and the like; an input device 44 formed of a keyboard, a mouse, a touch panel, and the like; an output device 45 formed of a monitor (a display), and the like; and a communication device 46 for communicating with other nodes, and the respective devices described above are connected to each other by internal buses, and the like. Further, each node may be a physical computing machine or may be a virtual computing machine for operating on the physical computing machine.

[Function]

Next, a function provided in each node of the electronic transaction system 1 will be described.

[Client Node and Approval Node]

Figure 4:
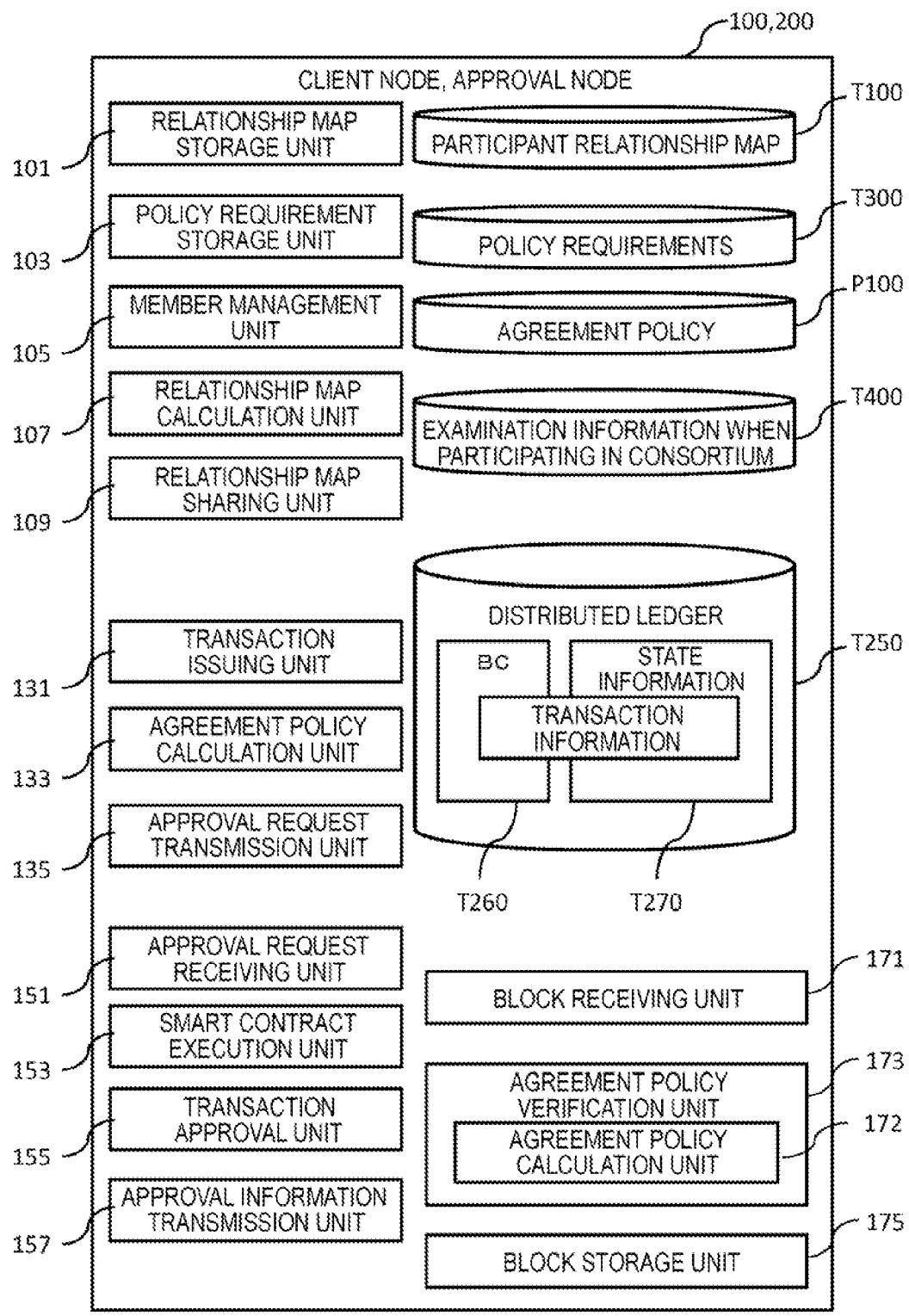
FIG. 4 is a diagram illustrating an example of a function provided in a client node and an approval node.

FIG. 4 is a diagram illustrating an example of functions provided in the client node 100 and the approval node 200. The client node 100 and the approval node 200 include: a relationship map storage unit 101; a policy requirement storage unit 103; a member management unit 105 that stores an electronic signature and authentication information of the participant; a relationship map calculation unit 107 that calculates the participant relationship map T100; a relationship map sharing unit 109 that shares the participant relationship map T100 with other nodes; a transaction issuing unit 131; an agreement policy calculation unit 133; an approval request transmission unit 135 that transmits an approval request related to the transaction, which is generated based upon the agreement policy P100, to the approval node 200 together with the transaction data; an approval request receiving unit 151 that receives the transaction data including the approval request from another node; a smart contract execution unit 153 that executes a smart contract based upon the received transaction data; an approval information transmission unit 157 that transmits the transaction data to which approval information corresponding to the approval request is imparted; a block receiving unit 171; an agreement policy verification unit 173 including an agreement policy calculation unit 172; and a block storage unit 175.

The relationship map storage unit 101 stores the relationship map (participant relationship map T100) which is information indicating a relationship between a plurality of parties involved in a predetermined transaction.

The participant relationship map T100 is information in which a relationship between the participants is stored with respect to predetermined attributes of the participants. In the embodiment, the participant relationship map T100 includes at least one of the business types or the roles of parties involved in a predetermined transaction, or a capital relationship or a transaction relationship between the parties, but is not limited thereto.

The policy requirement storage unit 103 stores the policy requirements T300, which are requirements for the parties involved in the transaction, necessary for the closing of the transaction.

Further, the policy requirements T300 are one or more pieces of information determined for each consortium in advance.

The relationship map calculation unit 107 generates or updates a relationship map (participant relationship map T100), based upon at least one of the information on the attributes of the parties involved in the predetermined transaction and transaction data acquired in the past.

The transaction issuing unit 131 generates (issues) the transaction data.

The agreement policy calculation unit 133 generates the agreement policy P100 which is a condition related to an approver of a transaction indicated by transaction data holding a predetermined transaction content, based upon the relationship map (participant relationship map T100) and the policy requirements T300.

Specifically, for example, the agreement policy calculation unit 133 extracts, from the relationship map, parties whose evaluation values (hereinafter referred to as a relationship value) indicating a relationship satisfy a predetermined condition with respect to the transaction indicated by the transaction data, and then generates the agreement policy P100 based upon the extracted parties and the policy requirements T300.

Further, the predetermined condition is, for example, a predetermined value or less, a minimum value, and the like.

Further, the agreement policy calculation unit 133 extracts the parties involved in the transaction from the transaction data, specifies parties whose evaluation values indicating the relationship satisfy the predetermined condition with respect to the transaction indicated by the transaction data from among the extracted parties, and allows the specified parties to be included in the parties indicated by the agreement policy.

The approval request transmission unit 135 transmits a predetermined approval request to a predetermined information processing device (that is, the approval node 200) which is associated with the approver of the transaction who is specified based upon the agreement policy P100 generated by the agreement policy calculation unit 133.

The block receiving unit 171 receives block data (blockchain data T260) including transaction data holding a predetermined transaction content which includes predetermined approval information transmitted by at least one or more electronic transaction devices (client node 100 or the approval node 200) from a predetermined information processing device (block distribution node 300).

The agreement policy verification unit 173 includes the agreement policy calculation unit 172. The agreement policy calculation unit 172 generates an agreement policy identical to the agreement policy P100 by the same process as that of the client node 100.

That is, the agreement policy verification unit 173 generates an agreement policy which is a condition related to the approver of the transaction indicated by the transaction data in the block data (blockchain data T260) received by the block receiving unit 171 based upon the relationship map and the policy requirements, and determines whether or not the party indicated by the predetermined approval information satisfies the condition related to the parties indicated by the generated agreement policy.

When it is determined that the party satisfies the condition, the block storage unit 175 records the blockchain data T260 received by the block receiving unit 171 in the distributed ledger T250.

Further, as illustrated in FIG. 4, the client node 100 stores examination information when participating in the consortium T400 and the distributed ledger T250. The distributed ledger T250 stores information including the blockchain data T260 and state information T270 which is information including the current (latest) transaction data T200.

Here, details of each type of information stored in the client node 100 (or the approval node 200) will be described.

[Participant Relationship Map]

FIG. 5 is a diagram illustrating an example of the participant relationship map T100. The participant relationship map T100 stores information on the strength of a relationship between the respective participants (in the example illustrated in FIG. 5, the participant relationship map T100 stores the aforementioned information by a matrix of a row and a column of a first participant list T102 and a second participant list T103). In the embodiment, the relationship therebetween is represented by an evaluation value (a relationship value) of 0 or greater and 1 or less, and the relationship is weaker as the relationship value is less, and the relationship is stronger as the relationship value is higher. Further, each relationship value is normalized. Normalization is performed, for example, by dividing each element by a common number so that the sum of squares of the elements of each row and column excluding a diagonal portion in the matrix becomes 1.

As described above, since the participant relationship map T100 according to the embodiment includes the information on the business types or the roles of the parties, or the information on the capital relationship or the transaction relationship of the parties, it is possible to appropriately extract participants who may collude in the transaction.

[Policy Requirement Information]

Next, FIG. 6 is a diagram illustrating an example of the policy requirements T300. The policy requirements T300 are information defining a determination method (policy) of the approval node. In the embodiment, the policy requirements T300 are defined as a method (an x-of-n method) in which an agreement formation is made when approval is obtained from an x node among the designated n nodes. That is, the policy requirements T300 are configured with one or more records including respective items of a requirement T301 in which an identifier assigned to each configuration requirement forming the policy requirements is stored; a Key T302 in which a content of the configuration requirement of the policy requirements indicated by the item of the requirement T301 is stored; and a value T303 in which a parameter relating to the configuration requirement of the item of the key T302 is stored.

In the embodiment, the policy requirements include a policy conditional expression that defines a general rule of the policy requirements, an essential node frame, an essential node list, a third-party node frame, and a third-party node designation condition.

The policy conditional expression is a conditional expression relating to a combination of an essential node which is an approval node in which the client node 100 always requests approval (for example, a node managed by an auditing institution or an important stakeholder among the participants); and a third-party node which is an approval node in which whether or not to request the approval differs depending on the transaction (for example, a participant having a weak relationship with the party involved in the transaction), and the like.

The essential node frame is the required number of essential nodes. The essential node list is a list of nodes that can be selected as the essential nodes. The third-party node frame is the required number of third-party nodes. The third-party node designation condition is a constraint condition related to the third-party node.

For example, in FIG. 6, a record T304 defines an x-of-n conditional expression as the policy conditional expression. A record T305 defines the essential node frame. A record T306 defines the essential node list. A record T307 defines the third-party node frame. A record T308 defines that one node having the lowest relationship value should be selected as the third-party node, as the third-party node designation condition. For example, the third-party node designation condition includes: a "min_x condition" that designates the x number of participants having the weakest relationship as the third-party nodes in the order of the weakest relationship; and a "threshold condition" that designates a participant whose value (a relationship value) indicating the relationship value is a threshold t or less as the third-party node.

Further, the policy requirements T300 according to the embodiment are the x-of-n method, but may be another method. For example, only essential nodes may be defined and all other nodes may be defined as the third-party nodes. Further, other kinds of nodes other than the essential node and the third-party node may be defined. Further, for the nodes described above, an organization rule and a specific organization designation may be combined.

In addition, a representation format of the data of the policy requirements T300 is arbitrary, and, for example, a simple AND/OR condition may be used as the policy conditional expression.

[Agreement Policy]

FIG. 7 is a diagram illustrating an example of the agreement policy P100. The agreement policy P100 is configured with one or more records including respective items of a node type P101 in which the type of the approval node (essential node or third-party node) is stored; a frame P102 in which the frame (required number) of the node indicated by the item of the node type P101 is stored; and an organization name P103 in which a list of node types indicated by the items of the node type P101 is stored.

In the example illustrated in FIG. 7, a node (a participant org2) having the lowest relationship value with respect to the node which has issued the transaction data T200 is added as the third-party node.

[Examination Information When Participating in the Consortium]

FIG. 8 is a diagram illustrating an example of the examination information when participating in the consortium T400. The examination information when participating in the consortium T400 includes: participant information T410 which is information on the attributes of each participant; and participant relationship information T420 which is information on a relationship between the participants.

The participant information T410 is configured with one or more records including respective items of an organization name T411 in which information (for example, an organization name) for specifying the participant is stored; an industry type T412 in which information on the industry type of the participant specified in the item of the organization name T411 is stored; and a role T413 in which information on the role of the participant specified in the item of organization name T411 in the consortium is stored.

The participant relationship information T420 is configured with one or more records including respective items of relationship information T421 in which identifiers assigned to each relationship between the participants are stored; an organization T422 in which a list of participants forming the relationship indicated by the item of the relationship information T421 is stored; a relationship T423 in which information on the content of the relationship indicated by the item of the relationship information T421 (for example, a relationship between capital alliances, parent subsidiaries, and the like) is stored; and a degree T424 in which information on the strength of the relationship indicated by the item of the relationship information T421 is stored.

Further, in the item of the organization T422, when a relationship among three organizations (A, B, and C) is recorded, for example, three records are added and information on the relationships between the organizations A and B, the organizations B and C, and the organizations C and A are respectively recorded in each record.

[Block Distribution Node]

Figure 9:
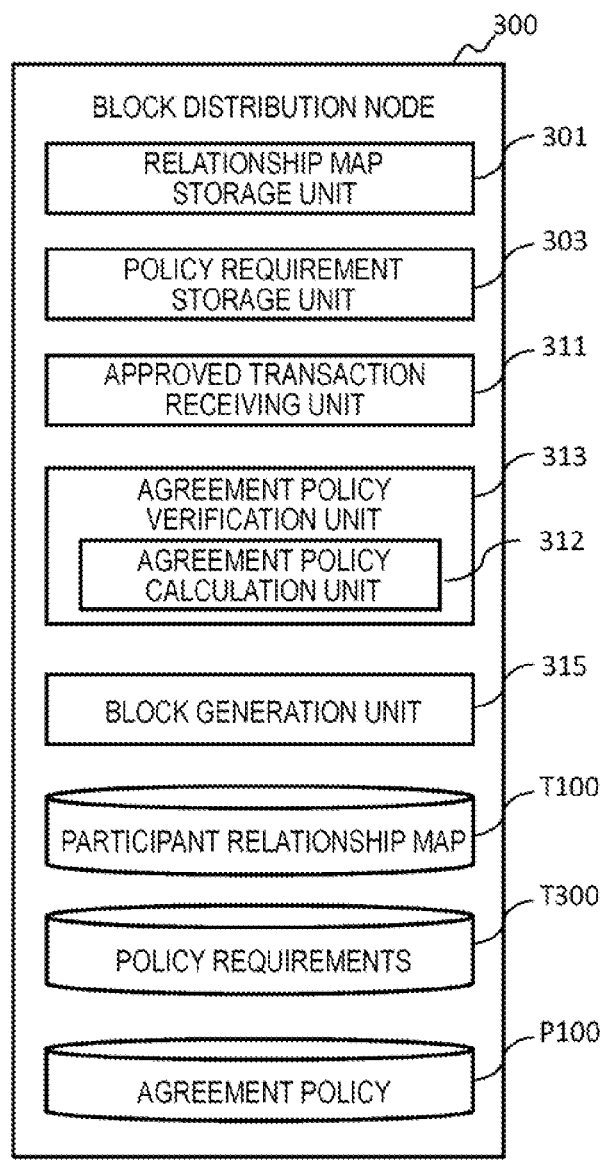
FIG. 9 is a diagram illustrating an example of a function provided in a block distribution node.

Next, FIG. 9 is a diagram illustrating an example of a function provided in the block distribution node 300. The block distribution node 300 includes a relationship map storage unit 301, a policy requirement storage unit 303, an approved transaction receiving unit 311, an agreement policy verification unit 313 including an agreement policy calculation unit 312 for calculating the agreement policy P100; and a block generation section 315.

The relationship map storage unit 301 is the same as the relationship map storage unit 101 of the client node 100 (or the approval node 200), and stores a relationship map (participant relationship map T100) which is information indicating a relationship between a plurality of parties involved in a predetermined transaction.

The policy requirement storage unit 303 is the same as the policy requirement storage unit 103 of the client node 100 (or the approval node 200), and stores the policy requirements T300, which are the requirements for the parties involved in the transaction, necessary for the closing of the transaction.

The approved transaction receiving unit 311 receives transaction data holding a predetermined transaction content, which includes predetermined approval information, from a predetermined information processing device (for example, the client node 100 or the approval node 200).

The agreement policy verification unit 313 generates an agreement policy which is a condition related to the approver of the transaction indicated by the transaction data received by the approved transaction receiving unit 311 based upon the relationship map (participant relationship map T100) and the policy requirements (policy requirements T300), and determines whether or not the party indicated by the predetermined approval information satisfies the condition related to the parties indicated by the generated agreement policy.

That is, the agreement policy verification unit 313 includes the agreement policy calculation unit 312, and the agreement policy calculation unit 312 generates an agreement policy which is the same as the agreement policy P100 by the same process as that of the client node 100.

When it is determined that the agreement policy verification unit 313 satisfies the above-described condition, the block generation unit 315 generates block data (blockchain data T260) including the transaction data received by the approved transaction receiving unit 311.

Next, the block generation unit 315 transmits (distributes) the generated blockchain data T260 to other nodes including the distributed ledger T250 (client node 100, the approval node 200, and the like).

The above-described functions of each node are realized by the hardware of each node or in such a manner that the processing device 41 of each node reads and executes programs stored in the main storage device 42 or the auxiliary storage device 43. Further, the programs are stored in non-temporary data storage media that can be read by each node, such as, for example, a secondary storage device, a non-volatile semiconductor memory, a storage device such as a hard disk drive or an SSD, or an IC card, an SD card, a DVD, and the like.

[Processes]

Next, the processes performed in the electronic transaction system 1 will be described.

First, the agreement formation process will be described.

[Agreement Formation Process]

FIG. 10 is a sequence diagram illustrating an example of the agreement formation process. The agreement formation process is started by, for example, inputting predetermined information on a transaction to the client node 100 and by performing an automatic execution program of the transaction incorporated in the client node 100 in advance.

First, the transaction issuing unit 131 of the client node 100 generates the transaction data T200 related to a predetermined transaction (hereinafter referred to as a target transaction, for example, a financial transaction) (s1).

[Transaction Data]

Here, FIG. 11 is a diagram illustrating an example of the transaction data T200. The transaction data T200 are configured to include information of respective items of a transaction identifier T201 which is an identifier of a transaction; an issuer T202 which is an issuer of the transaction (any one of the participants in the consortium); a function T203 which is a smart contract function in a smart contract related to the transaction; and a smart contract argument T204 which is an argument in the smart contract function. In the embodiment, the smart contract argument T204 is array information different for each smart contract function.

In the example illustrated in FIG. 11, a remittance smart contract function Move is called by an issuer org1, and then "100" is remitted from the participant org1 to the participant org2.

Referring back to FIG. 10, the agreement policy calculation unit 133 executes a process (hereinafter referred to as an agreement policy calculation process) of calculating the agreement policy P100 with respect to the transaction data T200 (hereinafter referred to as target transaction data) generated in s1 (s2). Details of the process will be described later.

Next, the approval request transmission unit 135 transmits the target transaction data (hereinafter referred to as approval request transaction data) to which an approval request for the target transaction is attached to each approval node 200 determined by the agreement policy calculation process (s3).

When the approval request receiving unit 151 of each approval node 200 of a transmission destination of the approval request transaction data receives the approval request transaction data, the smart contract execution unit 153 verifies the target transaction data in the approval request transaction data (s4).

When the validity of the target transaction data is confirmed by the verification, the transaction approval unit 155 of each approval node 200 transmits transaction data in which its own approval information (for example, an electronic signature) is imparted to the target transaction data back to the client node 100 (s5). Further, when the validity of the transaction data cannot be confirmed by the verification, for example, the transaction approval unit 155 does not respond to the client node 100, or transmits predetermined warning information to the client node 100.

When the approval request transmission unit 135 of the client node 100 receives, from each approval node 200, the transaction data to which the approval information is imparted, the approval request transmission unit 135 of the client node 100 generates new transaction data (hereinafter referred to as approved transaction data) in which such pieces of approval information are collected.

[Approved Transaction Data]

Here, FIG. 12 is a diagram illustrating an example of approved transaction data T210 generated by the client node 100. The approved transaction data T210 are information to which approval node information T211 is imparted to the transaction data T200. The approval node information T211 is in an array form, and the number of elements differs depending on the number of approval nodes. In each element, the electronic signature by the approval node is imparted to information of an identifier (for example, a participant name) of the approval node. In the example illustrated in FIG. 12, approval from the approval nodes org2, org3, and org4 is obtained.

Referring back to FIG. 10, the approval request transmission unit 135 of the client node 100 refers to the approval information of the approved transaction data T210, and determines whether or not the approval information satisfies the agreement policy P100 (s5a).

Specifically, for example, the approval request transmission unit 135 determines whether or not all the participants corresponding to the essential node and the third-party node specified by the node type P101 and the organization name P103 of the agreement policy P100 calculated in s2 are registered in the approval node information T211.

When all pieces of the approval information satisfy the agreement policy P100, the approval request transmission unit 135 transmits the approved transaction data T210 to the block distribution node 300 (s6). Further, when there is approval information that does not satisfy the agreement policy P100, for example, the approval information transmission unit 157 does not perform the process related to the approved transaction data T210 thereafter, or transmits the predetermined warning information to the client node 100 or the block distribution node 300.

The approved transaction receiving unit 311 of the block distribution node 300 receives the approved transaction data T210 from the client node 100. Then, the agreement policy verification unit 313 executes the process of independently calculating the agreement policy P100 based upon the received approved transaction data T210 (s7). The process described above is the same as the agreement policy calculation process in s2, and details thereof will be described later.

The agreement policy verification unit 313 of the block distribution node 300 executes the process (hereinafter referred to as an agreement policy verification process) of verifying whether or not the approval information in the received approved transaction data T210 satisfies the agreement policy calculated in s7.

Specifically, for example, the agreement policy verification unit 313 determines whether or not the approval node information T211 of the approved transaction data T210 satisfies the conditions of the predetermined essential node and the third-party node specified by the node type P101 and the organization name P103 of the agreement policy P100 calculated in s7.

When the conditions are satisfied, the agreement policy verification unit 313 temporarily stores and accumulates the above-described fact. Even when receiving another approved transaction data T210, the agreement policy verification unit 313 performs the same process described above.

Next, the block generation unit 315 of the block distribution node 300 generates the blockchain data T260 based upon each of temporarily stored transaction data (a transaction data group) at a predetermined timing (for example, every 10 minutes), and then transmits the generated blockchain data T260 to all other nodes in the electronic transaction system 1 (s9) Here, the blockchain data T260 will be described.

[Blockchain Data]

FIG. 13 is a diagram illustrating an example of the blockchain data T260. The blockchain data T260 are configured to include a plurality of block data T261 connected in time series via hash data T263. The respective block data T261 are blockchain data configured by a so-called hash chain. The respective block data T261 include a transaction data group T220 which is a set of at least one or more approved transaction data T210 and the hash data T263 generated from the transaction data group T220 of the immediately preceding block data T261.

Referring back to FIG. 10, each node which has received the blockchain data T260 verifies whether or not the party recorded in each transaction data and approval information in the blockchain data T260 satisfies the condition of the party specified by the agreement policy P100 (s10).

When it is confirmed that the condition thereof is satisfied, the node adds the blockchain data T260 to the distributed ledger T250 and records the blockchain data T260 therein, and then updates the state information T270 with the latest transaction data T200 (s11). On the other hand, when the condition thereof is not satisfied, the node does not record the blockchain data T260 in the distributed ledger T250 (s1). Thereafter, the agreement formation process is terminated.

Here, details of the agreement policy calculation process will be described.

[Agreement Policy Calculation Process]

FIG. 14 is a flowchart illustrating an example of the agreement policy calculation process performed by the client node 100. The agreement policy calculation process generates the agreement policy P100 from the policy requirements T300, the participant relationship map T100, and the transaction data T200. Further, the block distribution node 300 also generates the agreement policy P100, and the process thereof is the same as the above-described process.

First, when receiving the target transaction, the agreement policy calculation unit 133 of the client node 100 adds the information of the essential node to the agreement policy P100 (S101 and S110). Specifically, for example, the agreement policy calculation unit 133 acquires the record T305 and the record T306 of the policy requirements T300, generates the x-of-n expression from the information of the acquired record, and stores the content of the generated x-of-n expression (for example, 2-of-(org A, org B, and org C)) in each item of the frame P102 and the organization name P103 of the record of the agreement policy P100 in which "the essential node" is stored in the node type P101.

Further, the agreement policy calculation unit 133 adds the information of the third-party node to the agreement policy P100 (S120 to S140).

That is, first, the agreement policy calculation unit 133 acquires the policy requirements for the third-party node (S120). Specifically, for example, the agreement policy calculation unit 133 specifies a record in which the third-party node frame or the third-party node designation condition is stored in the key T302 among the policy requirements T300, and acquires the content of the specified record.

Next, the agreement policy calculation unit 133 generates a list (a participation organization list) formed of the issuer and the candidates of the third-party node in the target transaction (S121). Specifically, for example, the agreement policy calculation unit 133 acquires the contents of the issuer T202 and the smart contract argument T204 with respect to one record of the transaction data T200.

Next, the agreement policy calculation unit 133 acquires a relationship value between each candidate and the issuer from the respective participant relationship map T100 with respect to each candidate of the acquired third-party node (S122). Then, the agreement policy calculation unit 133 calculates the sum of the relationship values (S123). For example, the agreement policy calculation unit 133 acquires a row of the participant relationship map T100 with respect to each organization in the participated organization list, adds the relationship value for each column with respect to the row thereof, and calculates the sum of the relationship values in the target transaction. Thus, the agreement policy calculation unit 133 calculates the relationship value with respect to each third-party node. In this case, the agreement policy calculation unit 133 may calculate an average value of the relationship values instead of the total value of the relationship values.

The agreement policy calculation unit 133 performs the above-described processes from S121 to S123 for each of the records of the transaction data T200.

Next, the agreement policy calculation unit 133 determines the third-party node from the candidates of the third-party node based upon the third-party node designation condition and the third-party node frame acquired up to S123 (S130 to S132).

For example, when the third-party designation condition is "min_x condition" (S131), the agreement policy calculation unit 133 extracts x pieces of candidate nodes (candidates of the third-party node) whose sum of the relationship values is low in ascending order of the sum of the relationship values, and determines the extracted x pieces of candidate nodes as the third-party node. Further, for example, when the third-party designation condition is the "threshold condition" (S132), the agreement policy calculation unit 133 extracts all the candidate nodes whose sum of the relationship values is a predetermined threshold or less, and determines each of the extracted candidate nodes as the third-party node.

The agreement policy calculation unit 133 registers the third-party node determined in S130 to S132 and the third-party node frame acquired in S120 in the agreement policy P100 (S140). For example, the agreement policy calculation unit 133 stores the third-party node frame acquired in S120 in the frame P102 of the record whose node type P101 is the "third-party node", and stores the third-party node designated in S130 to S132 in the organization name P103 of the record, in the agreement policy P100.

Further, when other policy requirements are defined in the policy requirements T300, the agreement policy calculation unit 133 adds information on the aforementioned other policy requirements to the agreement policy P100 (S160).

As described above, each node itself can generate the agreement policy P100. Accordingly, data transfer for sharing the agreement policy P100 between the respective nodes is not required, whereby it is possible to prevent deterioration in the processing performance of the transaction in the electronic transaction system 1.

Next, the participant relationship calculation process will be described.

[Participant Relationship Calculation Process]

FIG. 15 is a flowchart illustrating an example of the participant relationship calculation process. The participant relationship calculation process is performed, for example, at a predetermined timing (for example, a predetermined time or a predetermined time interval). Here, a case in which the client node 100 performs the process will be described, but the same also applies to the approval node 200.

First, the relationship map calculation unit 107 determines whether or not the participant relationship map T100 is in a state (an initial state) where the participant relationship map T100 is not generated yet (S210). When the participant relationship map T100 is not generated (S210: YES), the process of S211 which will be described later is performed, whereas when the participant relationship map T100 is generated (S210: NO), the process of S220 which will be described later is performed.

In S211, the relationship map calculation unit 107 calculates a vector representing the attributes of each participant (node). Then, the relationship map calculation unit 107 calculates a relationship value between the respective participants based upon the calculated vector (S212).

Specifically, for example, the relationship map calculation unit 107 acquires a predetermined vector (an attribute vector) having an industry type and a role as an element by specifying the industry type and the role of each participant, based upon the industry type T412 and the role T413 of each record of the participant information T410 of the examination information when participating in the consortium T400. Next, the relationship map calculation unit 107 calculates the relationship value between the respective participants based upon a distance of the attribute vector of each participant, and stores each calculated relationship value in the participant relationship map T100.

Further, the attribute vector may be acquired, for example, by a predetermined database stored in advance, or may be calculated by acquiring predetermined element data (natural language data, and the like) from a database, a website, and the like related to each participant (a company, and the like) and then generating a corpus based upon the acquired predetermined element data.

For example, in the above-described database, when attribute data including manufacturing industry=0 and retail industry=1 in an industry axis, and supplier=0, and buyer=1 in a role axis are registered in advance, an attribute vector of the participant org1 becomes (0, 0), an attribute vector of the participant org2 becomes (1, 1), and an attribute vector of the participant org3 becomes (0, 1). In other words, the closer the industry, the role, and the like of participant are, the more similar the vector becomes. After calculating the attribute vector of each participant as described above, the relationship map calculation unit 107 calculates a cosine distance of the attribute vector between the participants as a relationship value, thereby generating a matrix representing the distance (relationship value) between the participants.

The relationship map calculation unit 107 stores the relationship value between the participants in the participant relationship map T100. Accordingly, as the participants are closer in the industry type, the role, and the like, the relationship therebetween becomes closer, such that the relationship value approaches 1.

Next, the relationship map calculation unit 107 specifies the relationship between the participants (S213), and corrects the relationship value calculated in S212 based upon the specified relationship (S214).

Specifically, for example, the relationship map calculation unit 107 acquires the organization T422 and the relationship T423 of each record of the participant relationship information T420 of the examination information when participating in the consortium T400, and updates the relationship value between the participants in the participant relationship map T100 based upon the acquired contents thereof. For example, when the content of the relationship T423 is a relationship such as a parent-subsidiary company or capital alliances, the relationship map calculation unit 107 performs correction for adding a predetermined value to the relationship value between the corresponding participants in the participant relationship map T100. Further, when the content of the relationship T423 is a competitive relationship, the relationship map calculation unit 107 performs correction for subtracting a predetermined value therefrom.

In the example illustrated in FIG. 8, since the org1 and the org2 are in a parent-subsidiary company relationship, the relationship map calculation unit 107 increases the relationship value related to the element where the org1 and the org2 intersect in the participant relationship map T100 by "0.2" which is a parameter value set corresponding to the parent-subsidiary company relationship.

As described above, since the relationship map calculation unit 107 generates the participant relationship map T100 by using the examination information when participating in the consortium T400, each node can perform a highly reliable electronic transaction even when the transaction has not been performed in the electronic transaction system 1 so far. That is, since the examination information when participating in the consortium T400 includes information on a background relationship of a participant which cannot be obtained from the data in the electronic transaction system 1, the risk of collusion between the nodes (participants) transmitting and receiving the transaction data T200 can be reduced.

Next, the relationship map calculation unit 107 generates the blockchain data T260 including the block data T261 using the generated participant relationship map T100 as the latest transaction data, and then transmits the generated blockchain data T260 to all the nodes via the smart contract specified by the transaction data T200 (S215). Thereafter, each node which has received the blockchain data T260 stores the received blockchain data T260 in its own distributed ledger T250 after performing a predetermined verification. Further, each node stores the latest participant relationship map T100 in the state information T270. Thus, the blockchain data T260 are shared with each node. As described above, the participant relationship calculation process is terminated.

As described above, each node shares the participant relationship map T100 as the transaction data in the form of the blockchain data, whereby each node can refer to the latest participant relationship map T100 without inquiring of other nodes. Accordingly, it is possible to improve the transaction processing performance in the electronic transaction system 1.

Next, in S220, the relationship map calculation unit 107 confirms whether or not a new participant (a node) is added to the examination information when participating in the consortium T400. When a new participant (a node) is added thereto (S220: YES), the process of S221 described below will be performed. On the other hand, when a new participant (node) is not added thereto (S220: NO), the process of S230 described below will be performed.

In S221, the relationship map calculation unit 107 calculates the attribute vector which is the same as that of S212 with respect to the added participant. Specifically, for example, the relationship map calculation unit 107 performs the same process as that of S212 with respect to the record newly added to the participant information T410 of the examination information when participating in the consortium T400.

Thereafter, the process subsequent to S213 is performed.

In S230, the relationship map calculation unit 107 determines whether or not to update the participant relationship map T100 by using the distributed ledger T250. Specifically, for example, the relationship map calculation unit 107 determines whether or not to update the participant relationship map T100 depending on whether or not the distributed ledger T250 has been updated, and whether or not a predetermined time has elapsed since the last update by using the distributed ledger T250.

When it is determined that the participant relationship map T100 is not updated by using the distributed ledger T250 (S230: NO), the participant relationship calculation process is terminated.

On the other hand, when it is determined that the participant relationship map T100 is updated by using the distributed ledger T250 (S230: YES), the relationship map calculation unit 107 first acquires the content (transaction data group T220) of the distributed ledger T250 updated after the previous update of the participant relationship map T100 (S231).

Next, the relationship map calculation unit 107 extracts all the participants of each transaction recorded in the distributed ledger T250 for each transaction data (S232). Specifically, for example, the relationship map calculation unit 107 acquires all of the issuer T202 and the smart contract argument T204 of each approved transaction data T210 of the transaction data group T220 acquired in S231.

Further, the relationship map calculation unit 107 may extract the information of the approval node information T211 of the transaction data group T220 when extracting the participants of the transaction. Accordingly, since the third-party node which approves the transaction is considered later as the relationship value, the third-party node can be prevented from being fixed with the lapse of time.

Then, with respect to each transaction, the relationship map calculation unit 107 adds a predetermined parameter value calculated corresponding to the type of the transaction or the combination of the participants to a corresponding relationship value in the participant relationship map T100 (S233). Thereafter, the process of S215 is performed.

For example, when a certain transaction is a remittance transaction from the participant org1 to the participant org2, the relationship map calculation unit 107 increases a relationship value between the participant org1 as a remittance source and the participant org2 as a remittance destination by 0.1, and stores the increased relationship value in the matrix of the corresponding participant relationship map T100. Further, when the number of participants of the transaction is three or more, for example, the relationship map calculation unit 107 generates an nC2 set of relationship values between the two parties by dividing the participants into a combination of the two parties.

Since the distributed ledger T250 is updated when the transaction is performed, the risk of collusion between the participants due to the data fixation of the participant relationship map T100 can be reduced by dynamically updating the participant relationship map T100 using the distributed ledger T250 as described above.

Further, as described above, the update (S220 to S215) of the participant relationship map T100 using the distributed ledger T250 can be performed independently of the update (S211 to S215) of the participant relationship map T100 using the examination information when participating in the consortium T400.

[Update Transaction of Participant Relationship Map]

Here, the transaction data (update transaction) of the participant relationship map T100 generated in S215 will be described.

Figure 16:
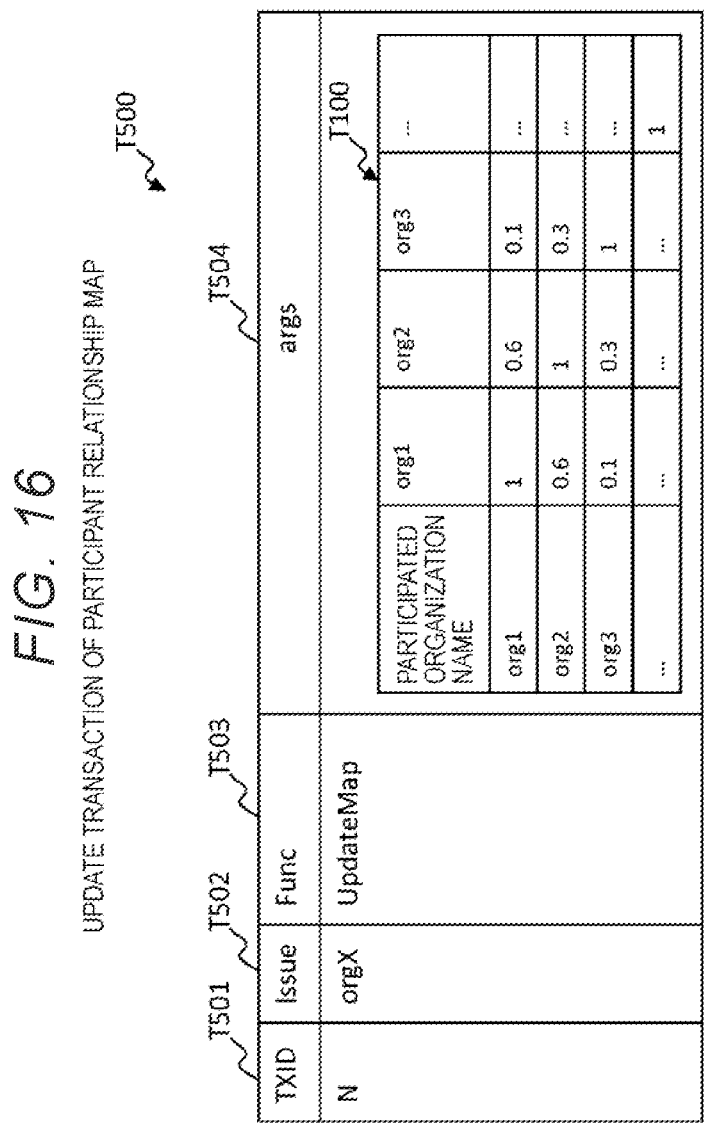
FIG. 16 is a diagram illustrating an example of an update transaction.

FIG. 16 is a diagram illustrating an example of an update transaction T500. The update transaction T500 is configured with one or more records including respective items of an identifier T501 of a transaction, an issuer T502 of the transaction, a transaction function T503 of the transaction, and an argument T504 in the transaction function. The argument T504 stores the data of the updated participant relationship map T100.

As described above, since the client node 100 (electronic transaction device 10) according to the embodiment generates the agreement policy P100 which is the condition related to the approver of the transaction indicated by the transaction data based upon the participant relationship map T100 and the policy requirements T300, and transmits the approval request to the approval node 200 of the approver of the transaction specified based upon the generated agreement policy P100, it is possible to appropriately select the approver in the transaction. Accordingly, it is possible to reduce the risk of collusion between the nodes at the time of closing of the transaction (agreement formation process of a distributed ledger system) without increasing the data transfer related to the transaction. Further, since the relationship between the parties involved in the transaction can be quantitatively evaluated by the participant relationship map T100, and further, objectivity can be given to the agreement policy which has been determined manually in a related art, the risk of collusion between the nodes can be reduced.

As described above, according to the client node 100 (electronic transaction device 10) according to the embodiment, it is possible to safely perform the electronic transaction without deteriorating the processing performance of the transaction.

The above description according to the embodiment has been made to facilitate the understanding of the present invention, and does not limit the present invention. The present invention can be modified and improved without departing from the gist thereof, and the equivalent thereof is included in the present invention.

For example, in the embodiment, the policy requirements T300 are set for each consortium, but the policy requirements T300 may be set for each smart contract or smart contract function. Accordingly, the policy management can be performed with higher accuracy, and the risk of collusion between the nodes can be reduced.

Further, in the agreement policy calculation process, instead of calculating the agreement policy P100 from the content of the transaction data T200, the agreement policy P100 may be calculated from the information such as the attributes, and the like of the participant. In this case, the agreement policy calculation unit 133 can generate the agreement policy P100 for each participant based upon the participant relationship map T100 before the transaction data T200 are issued. Accordingly, since it is not necessary to calculate the agreement policy P100 every time the transaction data T200 are generated, the processing load can be reduced.

Further, in the participant relationship calculation process according to the embodiment, the sum of the relationship values is obtained by simply adding up the relationship values of the plurality of candidates of a third-party node, but the sum of the relationship values may be obtained after multiplying a predetermined weighting coefficient for each participant.

The weighting coefficient is determined, for example, by obtaining a numerical value indicating the importance of the participant from the attributes of the issuer of the transaction, the smart contract function, the argument of the function, and the like. For example, the issuer is defined as "1.0", and the participant registered as the argument is defined as "0.5", and the like.

Further, each node may acquire the examination information when participating in the consortium T400 from a predetermined certificate authority of each node or may acquire the examination information when participating in the consortium T400 from an external database, and the like.

Further, each node may determine the agreement policy P100 by a method other than the method of sharing the participant relationship map T100. For example, when issuing the transaction data T200, the client node 100 may acquire the agreement policy P100 calculated by the block distribution node 300, and may determine the approval node based upon the acquired agreement policy P100. Further, each node may not share the participant relationship map T100, but may share the agreement policy P100 for each participant via the smart contract. In this case, it is not necessary for the client node 100 to calculate the agreement policy.

Further, in the embodiment, the client node 100 calculates the agreement policy P100 every time the transaction data T200 are issued, but the client node 100 may calculate the agreement policy P100 in advance and may update the calculated agreement policy P100 at a predetermined timing (for example, once a month).

Further, in the electronic transaction system 1, the agreement policies P100 of a plurality of patterns assumed in advance may be generated, and each node may acquire the agreement policies P100 thereof as necessary to perform a transaction.

Further, in the embodiment, a configuration in which one node determines all the approval nodes is shown, but a plurality of nodes may share and determine the approval nodes.

Further, the agreement formation process of each node may be implemented as a part of the smart contract functions of each node.

Further, the agreement formation process according to the embodiment may be applied to the agreement process by a Practical *Byzantine* Fault Tolerance (PBFT) method. In the PBFT, all the nodes perform the approval, and the transaction agreement is reached by a majority decision procedure between the nodes. In this case, for example, the agreement policy calculation unit 133 performs large weighting at the time of majority decision in the third-party node among the participating nodes, such that the third-party node has more right to determine whether or not the transaction agreement is reached than other nodes.

Accordingly, it is possible to suppress the fraudulence between the participating nodes (participants) trying to abuse the majority decision by increasing the number of nodes.

At least the following points are apparent by the above descriptions in the specification. That is, in the electronic transaction system 1 according to the embodiment, the agreement policy calculation unit may extract, from the relationship map, parties whose evaluation values indicating a relationship satisfy a predetermined condition with respect to the transaction indicated by the transaction data, and may generate the agreement policy based upon the extracted parties and the policy requirements.

As described above, since the agreement policy P100 is generated by extracting a third-party node (for example, a third-party node having a small relationship) who satisfies a predetermined condition from the participant relationship map T100, thereby enabling to realize approval by a transaction participant who has a low possibility to collude in a transaction (who has a higher possibility to perform legitimate approval), the electronic transaction can be performed with higher safety.

Further, the participant relationship map T100 includes the information on the third-party node, and therefore, it is also possible to evaluate whether or not the electronic transaction system 1 itself is suitable as a distributed ledger system (in the case of a network where a relationship between the participants is close, as in the case of no third-party node, the distributed ledger system is not required).

Further, the electronic transaction system 1 according to the embodiment may include the relationship map calculation unit for generating or updating the relationship map, based upon at least either one of the information on the attributes of the parties involved in the predetermined transaction and the transaction data acquired in the past.

Accordingly, by generating or updating the participant relationship map T100 based upon the attributes of the parties involved in the transaction or the transaction data acquired in the past, the participant who is likely to collude in the transaction can be detected at an early stage such that the electronic transaction can be performed with higher safety.

Further, in the electronic transaction system 1 according to the embodiment, the agreement policy calculation unit may extract parties involved in the transaction from the transaction data, may specify parties whose evaluation values indicating the relationship satisfy a predetermined condition with respect to the transaction indicated by the transaction data from among the extracted parties, and may allow the specified parties to be included in the parties indicated by the agreement policy.

As described above, the parties involved in the transaction are extracted from the transaction data, and parties who have a small relationship with the transaction is specified from among the persons involved, and then the specified parties are included in the parties of the agreement policy. Thus, it is possible not only to extract the participant who is likely to perform collusion of the parties in the transaction situation, but also to appropriately extract the participant who is likely to collude in the transaction.

Further, the electronic transaction system 1 according to the embodiment may include the relationship map sharing unit that transmits the generated or updated relationship map to another electronic transaction device.

Accordingly, each node can quickly calculate the agreement policy P100 without acquiring the participant relationship map T100 from other nodes by sharing the participant relationship map T100 among the nodes. As a result, the agreement formation of the transaction can be performed without deteriorating the processing performance of the transaction.

Further, in the electronic transaction system 1 according to the embodiment, an electronic transaction device may include: a block receiving unit that receives, from a predetermined information processing device, block data including transaction data holding a predetermined transaction content, which includes predetermined approval information, transmitted by at least one or more of the electronic transaction devices; and an agreement policy verification unit that generates an agreement policy which is a condition related to an approver of a transaction indicated by the transaction data in the received block data based upon the relationship map and the policy requirements, and determines whether or not the party indicated by the predetermined approval information satisfies a condition related to the parties indicated by the generated agreement policy.

As described above, the electronic transaction device (client node 100 or the approval node 200) verifies the block data (blockchain data T260) of each electronic transaction device received from the predetermined information processing device (block distribution node 300) based upon the participant relationship map T100 and the agreement policy, and thus, it is possible not only to surely exclude a participant who is likely to collude in the transaction, but also to safely perform the electronic transaction by the so-called blockchain.

In the electronic transaction system 1 according to the embodiment, an electronic transaction verification device may include: a relationship map storage unit that stores a relationship map which is information indicating a relationship between a plurality of parties involved in a predetermined transaction; a policy requirement storage unit that stores policy requirements, which are requirements for the parties involved in the transaction, necessary for the closing of the transaction; an approved transaction data receiving unit that receives transaction data holding a predetermined transaction content, which includes predetermined approval information, from a predetermined information processing device; an agreement policy verification unit that generates an agreement policy which is a condition related to an approver of a transaction indicated by the received transaction data based upon the relationship map and the policy requirements, and determines whether or not the party indicated by the predetermined approval information satisfies a condition related to the parties indicated by the generated agreement policy; and a block generation unit that generates block data including the received transaction data when it is determined that the condition is satisfied.

As described, the electronic transaction verification device 20 (block distribution node 300) generates the agreement policy in the same manner as that of the electronic transaction device 10 and performs verification thereof, and then generates the information (blockchain data T260) indicating that the transaction is closed when it is determined that the approval is correctly performed. Thus, it is possible not only to surely exclude the participant who is likely to collude in the transaction, but also to safely perform the electronic transaction by the so-called blockchain.

What is claimed is:

1. An electronic transaction device coupled to a block distribution device, each of the electronic transaction device and the block distribution device comprising:
   at least one processor; and
   at least one non-transitory storage medium, the at least one non-transitory storage medium storing:
   a relationship map which is information indicating a strength of a relationship between a plurality of electronic devices, including the electronic transaction device and a plurality of approval electronic devices involved in a predetermined transaction; and
   policy requirements, which are requirements for the plurality of electronic devices involved in the predetermined transaction, necessary for the closing of the predetermined transaction, the predetermined transaction being a certain type of transaction and including transaction data; and
   at least one program,
   wherein the at least one processor of the electronic transaction device is configured to execute the at least one program of the electronic transaction device to:
      extract, from the relationship map, a plurality of the approval electronic devices whose evaluation values indicate a strength of a relationship with the electronic transaction device that satisfy a predetermined condition with respect to the certain type of transaction of the predetermined transaction and allow the extracted approval electronic devices to be included in an agreement policy related to the predetermined transaction, the predetermined condition being determined by the policy requirements and indicating a combination of the approval electronic devices including an essential approval electronic device selected from an essential approval electronic device list, the essential approval electronic device list including the approval electronic devices that have a relatively strong strength of relationship with the electronic transaction device, and a third party approval electronic device selected from a third party approval electronic device list, the third party approval electronic device list including the approval electronic devices that have a relatively weak strength of relationship with the electronic transaction device as compared to the approval electronic devices in the essential approval electronic device list;
      generate the agreement policy which is a condition related to the extracted approval electronic devices, based upon the relationship map, and the policy requirements;
      transmit an approval request to the plurality of extracted approval electronic devices, the approval request including the transaction data and a request for approval based upon the generated agreement policy;
      receive approval responses from the plurality of extracted approval electronic devices; and
      upon receiving approval responses from all of the plurality of extracted approval electronic devices, generate approved transaction data and transmit the approved transaction data to the block distribution device, and
   wherein the at least one processor of the block distribution device is configured to execute the at least one program of the block distribution device to:
      receive the approved transaction data from the electronic transaction device;
      independently extract, from the relationship map, the plurality of approval electronic devices whose evaluation values indicate a strength of a relationship with the electronic transaction device that satisfy a predetermined condition with respect to the certain type of transaction of the predetermined transaction and allow the extracted approval electronic devices to be included in the agreement policy related to the predetermined transaction;
      independently generate the agreement policy which is a condition related to the extracted approval electronic devices, based upon the relationship map, and the policy requirements;
      determine whether or not the approved transaction data received from the electronic transaction device satisfies the independently generated agreement policy; and
      when the approved transaction data satisfies the independently generated agreement policy, generate blockchain data based on the approved transaction data and transmit the blockchain data to the electronic transaction device and each of the plurality of approval electronic devices, and
   wherein the relationship map stored in each of the electronic transaction device and the block distribution device is maintained to store the same data and is dynamically updated to store the same updated data, and
   wherein the relationship map is initially created and dynamically updated by performing the following steps by the at least one processor:
      determining whether or not the relationship map is in an initial state where the relationship map is not generated yet;
      when the relationship map is not generated, performing the steps of:

calculating an attribute vector representing attributes of each of the electronic devices;

calculating a relationship value between the respective electronic devices based upon a distance of the calculated attribute vector of each of the electronic devices, and storing each calculated relationship value in the relationship map; and generating the blockchain data including the block data using the generated relationship map as the latest transaction data, and then transmitting the generated blockchain data to all the electronic devices via the smart contract specified by the transaction data, and when the relationship map has already been generated and upon determining that the relationship map needs to be dynamically updated because either a distributed ledger has been updated or a predetermined time has elapsed since the last update by using the distributed ledger, performing the following steps by the at least one processor:

acquiring the content of the distributed ledger including a transaction data group;

extracting all of the electronic devices of each transaction recorded in the distributed ledger for each transaction data including acquiring all issuers, a smart contract argument and approval electronic device information of each approved transaction data of the transaction data group;

with respect to each transaction, adding a predetermined parameter value calculated corresponding to the type of the transaction or the combination of the electronic devices to a corresponding relationship value in the relationship map; and again generating the blockchain data including the block data using the generated relationship map as the latest transaction data, and then transmitting the generated blockchain data to all the electronic devices via the smart contract specified by the transaction data.

2. The electronic transaction device coupled to the block distribution device according to claim 1,
wherein the relationship map is generated or updated based upon at least either one of information on attributes of the electronic devices in the predetermined transaction and transaction data acquired in the past.

3. The electronic transaction device coupled to the block distribution device according to claim 2, wherein the at least one processor is further configured to:
share the generated or updated relationship map with another electronic transaction device.

4. The electronic transaction device coupled to the block distribution device according to claim 1, wherein the calculating of the relationship value between the respective electronic devices based upon the calculated attribute vector comprises:
acquiring a predetermined attribute having an industry type and a role as an element by specifying the industry type and the role of each of the electronic devices, based upon the industry type and the role of each record of relationship information of examination information of each of the electronic devices participating in a consortium.

5. The electronic transaction device coupled to the block distribution device according to claim 1,
wherein the attribute vector is acquired by a predetermined database stored in advance in the above-described database,
wherein the attribute data includes a manufacturing industry and a retail industry in an industry axis, and a supplier and a buyer in a role axis which are registered in advance,
wherein an attribute vector of each electronic device is calculated based on the closeness of the industry and role of each electronic device and the closer that they are, the more similar is the attribute vector.

6. The electronic transaction device coupled to the block distribution device according to claim 5,
wherein after calculating the attribute vector of each electronic device the at least one processor calculates a cosine distance of the attribute vector between the electronic devices as the relationship value and generates a matrix representing the cosine distance between the electronic devices, and
wherein the at least one processor stores the relationship value between the electronic devices in the relationship map.

7. The electronic transaction device coupled to the block distribution device according to claim 6, wherein the at least one processor is further configured to:
when a certain transaction is a remittance transaction from a first electronic device to a second electronic device, increasing a relationship value between the first electronic device as a remittance source and the second electronic device as a remittance destination by a predetermined amount, and storing the increased relationship value in the matrix of the corresponding relationship map.

8. The electronic transaction device coupled to the block distribution device according to claim 1, wherein the at least one processor further performs the steps of:
specifying the relationship between the electronic devices, and correcting the calculated relationship value based upon the specified relationship by:
acquiring the organization and the relationship of each record of relationship information of examination information of the electronic devices participating in a consortium, and updating the relationship value between the electronic devices in the relationship map based upon the acquired information.

9. The electronic transaction device coupled to the block distribution device according to claim 1,
wherein each of the electronic devices, which has received the blockchain data, stores the received blockchain data in its own distributed ledger after performing a predetermined verification, and
wherein each of the electronic devices stores the latest relationship map in its state information.

10. The electronic transaction device coupled to the block distribution device according to claim 1, wherein the at least one processor further performs the steps of:
upon determining that a new electronic transaction device has been added to examination information when participating in a consortium, calculating the attribute vector with respect to the added electronic device.

11. An electronic transaction method comprising the steps of:
storing, by an electronic transaction device and a block distribution device, a relationship map which is information indicating a strength of a relationship between a plurality of electronic devices, including the electronic transaction device and a plurality of approval electronic devices involved in a predetermined transaction;

storing, by the electronic transaction device and the block distribution device, policy requirements, which are requirements for the plurality of electronic devices involved in the predetermined transaction, necessary for the closing of the predetermined transaction, the predetermined transaction being a certain type of transaction and including transaction data;

extracting, by the electronic transaction device from the relationship map, a plurality of the approval electronic devices whose evaluation values indicate a strength of a relationship with the electronic transaction device that satisfy a predetermined condition with respect to the certain type of transaction of the predetermined transaction and allowing the extracted approval electronic devices to be included in an agreement policy related to the predetermined transaction;

generating, by the electronic transaction device, the agreement policy which is a condition related to the extracted approval electronic devices, based upon the relationship map, and the policy requirements;

transmitting, by the electronic transaction device, an approval request to the plurality of extracted approval electronic devices, the approval request including the transaction data and a request for approval based upon the generated agreement policy, the predetermined condition being determined by the policy requirements and indicating a combination of the approval electronic devices including an essential approval electronic device selected from an essential approval electronic device list, the essential approval electronic device list including the approval electronic devices that have a relatively strong strength of relationship with the electronic transaction device, and a third party approval electronic device selected from a third party approval electronic device list, the third party approval electronic device list including the approval electronic devices that have a relatively weak strength of relationship with the electronic transaction device as compared to the approval electronic devices in the essential approval electronic device list;

receiving, by the electronic transaction device, approval responses from the plurality of extracted approval electronic devices;

upon receiving approval responses from all of the plurality of extracted approval electronic devices, generating, by the electronic transaction device, approved transaction data and transmitting the approved transaction data to the block distribution device;

receiving, by the block distribution device, the approved transaction data from the electronic transaction device;

independently extracting, by the block distribution device from the relationship map, the plurality of approval electronic devices whose evaluation values indicate a strength of a relationship with the electronic transaction device that satisfy a predetermined condition with respect to the certain type of transaction of the predetermined transaction and allow the extracted approval electronic devices to be included in the agreement policy related to the predetermined transaction;

independently generating, by the block distribution device, the agreement policy which is a condition related to the extracted approval electronic devices, based upon the relationship map, and the policy requirements;

determining, by the block distribution device, whether or not the approved transaction data received from the electronic transaction device satisfies the independently generated agreement policy; and when the approved transaction data satisfies the independently generated agreement policy, generating, by the block distribution device, blockchain data based on the approved transaction data and transmitting the blockchain data to the electronic transaction device and each of the plurality of approval electronic devices, wherein the relationship map stored in each of the electronic transaction device and the block distribution device is maintained to store the same data and is dynamically updated to store the same updated data, and wherein the relationship map is initially created and dynamically updated by performing the following steps by the electronic transaction device:

determining whether or not the relationship map is in an initial state where the relationship map is not generated yet;

when the relationship map is not generated, performing the steps of:

calculating an attribute vector representing attributes of each of the electronic devices;

calculating a relationship value between the respective electronic devices based upon a distance of the calculated attribute vector of each of the electronic devices, and storing each calculated relationship value in the relationship map; and generating the blockchain data including the block data using the generated relationship map as the latest transaction data, and then transmitting the generated blockchain data to all the electronic devices via the smart contract specified by the transaction data, and when the relationship map has already been generated and upon determining that the relationship map needs to be dynamically updated because either a distributed ledger has been updated or a predetermined time has elapsed since the last update by using the distributed ledger, performing the following steps by the at least one processor:

acquiring the content of the distributed ledger including a transaction data group;

extracting all of the electronic devices of each transaction recorded in the distributed ledger for each transaction data including acquiring all issuers, a smart contract argument and approval electronic device information of each approved transaction data of the transaction data group;

with respect to each transaction, adding a predetermined parameter value calculated corresponding to the type of the transaction or the combination of the electronic devices to a corresponding relationship value in the relationship map; and again generating the blockchain data including the block data using the generated relationship map as the latest transaction data, and then transmitting the generated blockchain data to all the electronic devices via the smart contract specified by the transaction data.

12. The electronic transaction method according to claim 11, further comprising the step of:

generating or updating, by the electronic transaction device, the relationship map based upon at least either one of information on attributes of the electronic devices involved in the predetermined transaction and transaction data acquired in the past.

13. The electronic transaction method according to claim 12, further comprising the step of:

sharing, by the electronic transaction device, the generated or updated relationship map with another electronic transaction device.

* * * * *